United States Patent [19]
Fiebelmann et al.

[11] 3,709,781
[45] Jan. 9, 1973

[54] SPACE NUCLEAR PLANT

[75] Inventors: Peter Fiebelmann, Besozzo; Helmut Neu, Travedona; Umberto Buzzi, Laveno, all of Italy

[73] Assignee: European Atomic Energy Community (Euratom) Brussels, Belgium

[22] Filed: May 12, 1969

[21] Appl. No.: 823,794

[30] Foreign Application Priority Data

May 24, 1968 Germany......................P 12 64 364.0

[52] U.S. Cl........................176/39, 310/4, 165/105
[51] Int. Cl. ..............................................G21c 15/00
[58] Field of Search..........................176/39-43, 33; 310/4; 165/105

[56] References Cited

UNITED STATES PATENTS

| | | | |
|---|---|---|---|
| 3,094,473 | 6/1963 | Humbach | 176/61 |
| 3,259,766 | 7/1966 | Beckjord et al. | 176/33 |
| 3,302,042 | 1/1967 | Grover et al. | 176/39 |
| 3,378,449 | 4/1968 | Roberts et al. | 165/105 |
| 3,451,641 | 6/1969 | Leventhal | 310/4 |
| 3,457,436 | 7/1969 | Levedahl | 310/4 |
| 3,489,203 | 1/1876 | Fischell | 165/105 |
| 3,517,730 | 6/1970 | Wyatt | 165/105 |

Primary Examiner—Reuben Epstein
Attorney—Stevens, Davis, Miller & Mosher

[57] ABSTRACT

A nuclear power plant for space stations having a heating core, a reflector at least partially pivotal about the core and a system of heat pipes penetrating into the core. The heat pipes supply reaction heat to thermionic converters disposed in the reflector zone with heat reflected from the converters being dissipated into space by cooling means.

6 Claims, 4 Drawing Figures

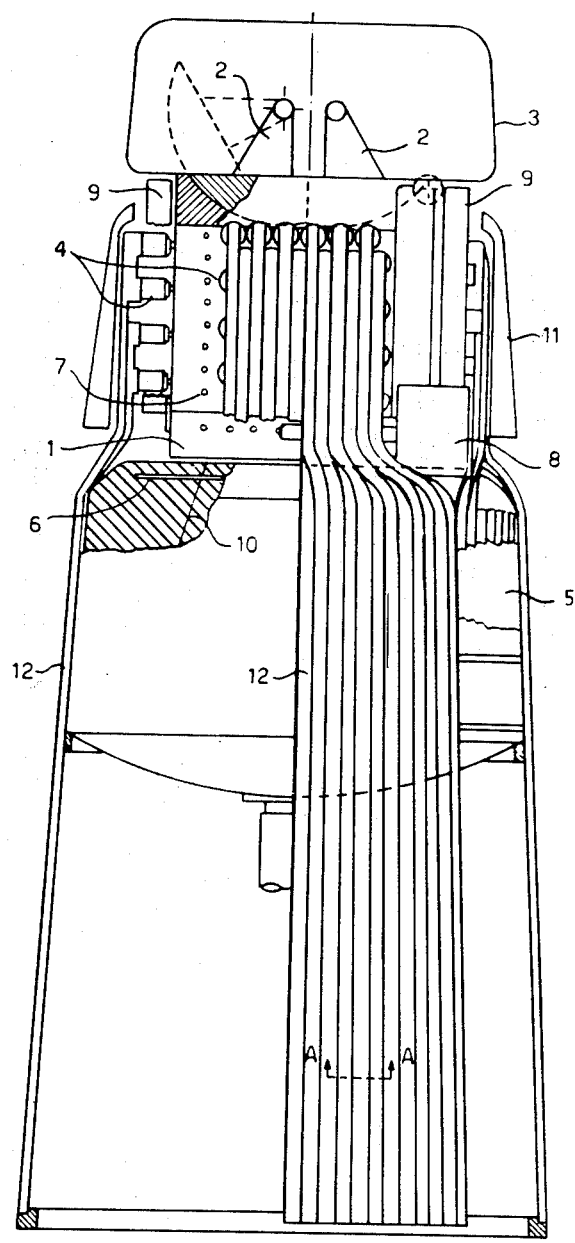
FIG.1
FIG.2
A-A
INVENTOR'S
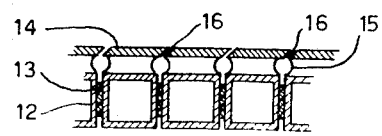
ATTORNEY'S

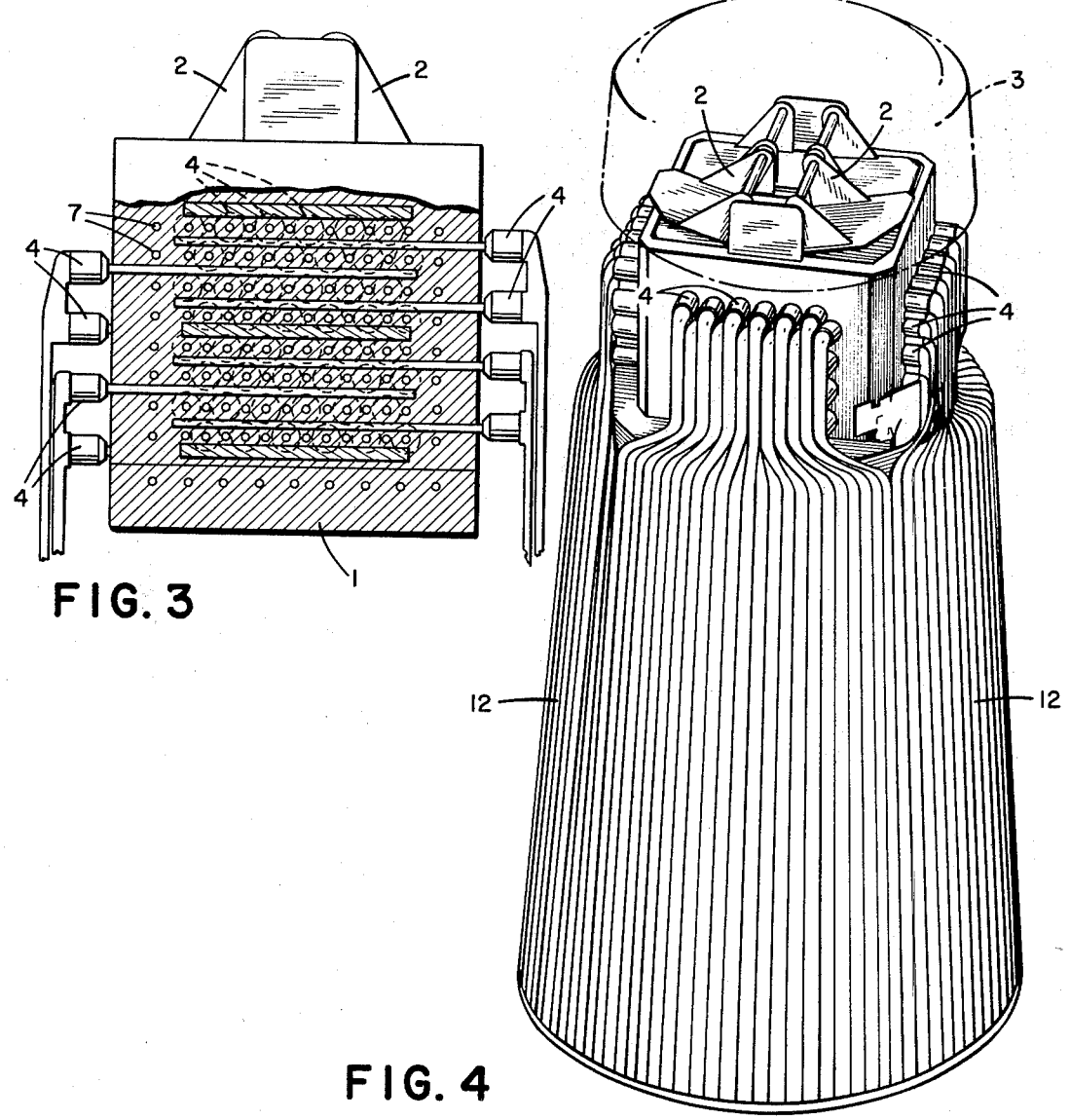

SPACE NUCLEAR PLANT

The invention relates to a nuclear power plant for a space station.

Nuclear reactors are important as energy sources in space stations owing to their favorable specific power to weight ratio at maximum powers above 30 kW.

Projects which have already materialized (for example SNAP 10 A) or whose planning has been disclosed provide for a conversion of the fission heat into electrical energy, either by means of turbo generators or by means of thermo-electric and thermionic converters. Elements which are common to all such power plants comprise a heat generating nuclear core, preferably at the end of the structural unit; a reflector shell surrounding said core and adapted to be partially pivotable for control purposes; a shield against nuclear radiation, the operational load of the station being disposed in the radiation shadow of the shield; a thermo-electric or thermionic converter and a large-surface, surface, usually conical, radiation cooler for dissipating into ambient space the heat losses from the conversion.

The invention relates to such a nuclear reactor whose heat is extracted from the core by means of a system of heat pipes which extend through the core in two directions, said heat being supplied to the emitters of thermionic converters disposed in the zone of the reflector shell. The loss heat is radiated in a cooling zone.

It is already know to employ heat pipes for conducting the heat from the core to the converters (U.S. Pat. No. 3,302,042 to Grover et al.). It is furthermore known to construct the cooling cone itself from a plurality of heat pipes so that the temperature conditions over the entire cone surface area are equalized (report No. FBK 67–46 issued by the German Federal Ministry for scientific research). This project however suffers from the disadvantage that it is necessary to provide a liquid metal circuit as a thermal transfer medium and power distributor between the converters and the radiating heat pipes, such circuit requiring a pump and having to be well protected against damage by meteorites.

These disadvantages are avoided or reduced by the invention.

The invention provides nuclear power plant for a space station with a heat generating core, a reflector which is partially pivotably for controlling the reactor and a system of heat pipes which inter-penetrate the core in two directions for supplying the reaction heat to thermionic converters disposed in the reflector zone, the heat rejected from said converters being dissipated into outer space via a cooling cone, characterized in that the cooling cone comprises a plurality of parallel heat pipes each having its heating zone directly thermally coupled to one or more collectors of the converters.

In a preferred embodiment the cooling cone extends substantially on the reactor-distal side of the radiation shield while further heat pipe systems for cooling the reflectors and the radiation shield have their radiation surfaces disposed on the proximal side of said shield.

The radiation shield is preferably cooled by heat pipes only in the zone near to the reactor core while a thermal transfer structure, for example comprising solid copper rods, is provided for transferring the heat produced in the shield zone distal relative to the core into the heat pipe zone.

In a preferred embodiment of the invention, meteorite baffle plates are mounted by resilient, thermally conducting elements on and space from those sides of the heat pipes forming the cooling cone which face outer space. The baffle plates of adjacent heat pipes are preferably constructed to overlap without being in mutual physical contact in order to protect the electrical insulators which may have to be provided between the heat pipes.

The invention will be explained hereinbelow by means of examples with reference to two illustrations of which FIG. 1 is a partially sectioned view of a nuclear powered space plant according to the present invention;

FIG. 2 is an enlarged section view taken along line A—A of FIG. 1 showing the cooling cone skin;

FIG. 3 is a vertical section through the reactor portion of the space plant; and FIG. 4 is a perspective view of the inventive nuclear powered space plant.

The nuclear power plant according to FIG. 1 is provided with a heat producing core, concealed in this illustration, and surrounded by a reflector shell 1. The wall of the reflector which covers the top of the core as seen in FIG. 1 comprises four pivotable reflector elements 2 which are driven by motors and control the reactivity of the reactor. This zone is protected by a cover 3 against meteorite impact.

Heat is extracted from the reactor core by means of heat pipes which traverse the entire core and are thermally connected on one side to the emitters of thermionic converters 4. As to a preferred embodiment of such converters and their coupling to heat pipes, reference is made to British Pat. No. 1,158,915 which is an English language equivalent of French Pat. No. 1,490,227 of Aug. 23, 1966. The heat pipes are subdivided into four groups which inter-penetrate closely in the core and are coupled respectively to the converters on the four lateral side surfaces of the core. For example, the converters of one side are disposed in eight rows of six converters each.

Immediately below the reactor core is a radiation shield 5 behind which is disposed the operational load of the space station, not shown in the illustration. The heat produced in the reflector walls and the radiation shield by the nuclear radiation is ducted via a separate heat pipe system 6 and 7 to the lateral, vertical edges of the reflector block where radiator surfaces 8 and 9 dissipate the heat into outer space. It is sufficient for the heat pipe 6 for cooling the radiation shield to be disposed only in that zone which is adjacent to the core there being a metallic cone (only a fragment of which has been shown or a structure of solid rods 10 of material of high thermal conductivity incorporated into the shield (only one representative rod 10 of this structure is shown schematically in the drawing) by means of which the heat is transferred from the reactor-distal zone into the heat pipe zone. This structure may also contribute to improving the mechanical stiffening of the whole structure. As a protection of the converters, the four lateral surfaces of the reactor are surrounded on the exterior by meteorite baffle plates 11.

Heat is transferred from the collector portions of the thermionic converters 4 by means of heat pipes 12 which are directly thermally coupled to the converters and extend from the core zone over the entire length of the cooling cone. It is sufficient for only one heat pipe to be provided for every two converters. While the heat pipes in the core zone are stacked super-jacently owing to shortage of space, said pipes extend adjacently along surface lines in the zone of the cooling cone. Accordingly, they substantially cover the entire surface area of the cooling cone. The electrical insulation between converter collectors may be provided either in the zone in which thermal coupling to the heat pipes is provided or it may be obtained by insulating strata which are inserted between the heat pipes over their entire length. This alternative is illustrated in FIG. 2. It shows the heat pipes of rectangular construction and being mechanically joined to each other via insulating strata 13. To protect the heat pipes against meteorites, the heat pipe sides exposed to outer space are covered by baffle plates 14 which are mounted on the heat pipes but at a distance therefrom via resilient strips 15 of good thermal conductivity, for example of titanium or copper. The resilient manner of mounting minimizes the danger of penetration of the baffle plates. In a preferred embodiment the baffle plates of adjacent heat pipes overlap without being in physical contact with each other so that the zones between heat pipes are also protected. Insulating ceramic spacers 16 may also be provided at intervals in the inclined gap between the individual baffle plates.

Although effective protection against meteorites may appear necessary, the destruction of one or individual heat pipes is by no means catastrophic for the entire power plant. By virtue of the system of inter-crossing heat pipes in the reactor core it is possible for the heat, normally dissipated by one heat pipe to be transferred to adjacent heat pipes, in particular to inter-crossing heat pipes in the event of destruction of the first mentioned heat pipe. In this connection it should also be noted that the two converters cooled by a single heat pipe do not originate from adjacent converter rows. The risk of simultaneous failure of the cooling system of two adjacent parallel heat pipes is small.

In a project based on the invention and having an output of approximately 50 kWe, the core temperature is 1,850°C; the temperature of the reflector and of the collectors of the converters is approximately 800°C. The thermal output of a heat pipe 12 amounts to 4.7 kW and the number of heat pipes disposed on the cooling cone amounts to approximately 100. The overall surface area of the cooling cone available for radiating the loss heat of approximately 475 kW amounts to 7 m$^2$.

We claim:

1. A nuclear power plant for a space station comprising a heat generating nuclear core, a reflector surrounding said core, a portion of said reflector being pivotable between open and closed positions for controlling the reactor a first heat pipe system comprising a plurality of heat pipes penetrating into the core in at least two directions and extending outwardly through said reflector, a plurality of thermionic converters disposed adjacent the reflector, each said converter having an emitter and a collector with the emitter of each said converter being thermally coupled to one of the heat pipes of said first system, a radiation shield disposed behind a non-pivotable portion of said reflector and a second heat pipe system comprising a plurality of heat pipes extending substantially parallel to each other and from the reflector where each pipe of the second system is coupled to the collector of at least one converter such that cooling portions of said second heat pipes constitute in common a hollow truncated cooling cone which has an increasing diameter at the reactor distal side and which has its smallest diameter within said radiation shield.

2. A nuclear power plant according to claim 1, further comprising a third system of heat pipes which extend from the reflector and the radiation shield and are adapted to withdraw heat from the reflector and the shield structures, respectively, outwardly such that cooling portions of said third heat pipes constitute a prolongation of the cooling cone on the reactor proximal side of the radiation shield.

3. A nuclear power plant according to claim 2, in which the radiation shield is cooled by said third system of heat pipes only in a zone disposed near to the core and further comprising a thermal transfer structure provided in the shield adapted to transfer the heat produced in the core-distal zone of the shield into the zone of said third heat pipes.

4. A nuclear plant according to claim 1, further comprising meteorite baffle plates which cover the heat pipes forming the cooling cone, each said plate being mounted on that side which faces outer space, and resilient, thermally conducting elements mounting said baffle plates in spaced relation from said heat pipes.

5. A nuclear power plant according to claim 4, in which baffle plates for adjacent heat pipes overlap without being in direct physical contact with each other.

6. A nuclear power plant according to claim 5, further comprising ceramic insulators provided as spacers between overlapping baffle plates.

* * * * *